Feb. 1, 1927.

L. C. HARTMANN 1,616,369

MOTION TRANSMISSION MECHANISM

Filed Jan. 7, 1926

WITNESSES

INVENTOR
Ludwig C. Hartmann
BY
ATTORNEYS.

Patented Feb. 1, 1927.

1,616,369

UNITED STATES PATENT OFFICE.

LUDWIG CARL HARTMANN, OF ELMHURST, NEW YORK.

MOTION-TRANSMISSION MECHANISM.

Application filed January 7, 1926. Serial No. 79,803.

This invention relates to mechanisms that are used for transferring rotary motion from a high speed driving shaft to a means to be driven at a uniform reduced speed which may be varied and for imparting rotational movement in different directions.

The principal object of the invention is to provide an improved, efficient and effectual mechanism of the indicated character which may be utilized for imparting differential motion in different kinds of machinery or in conjunction with automobile engines and the like.

The nature of the invention and its distinguishing features and advantages will appear when the following specification is read in connection with the accompanying drawing, in which—

Figure 1:
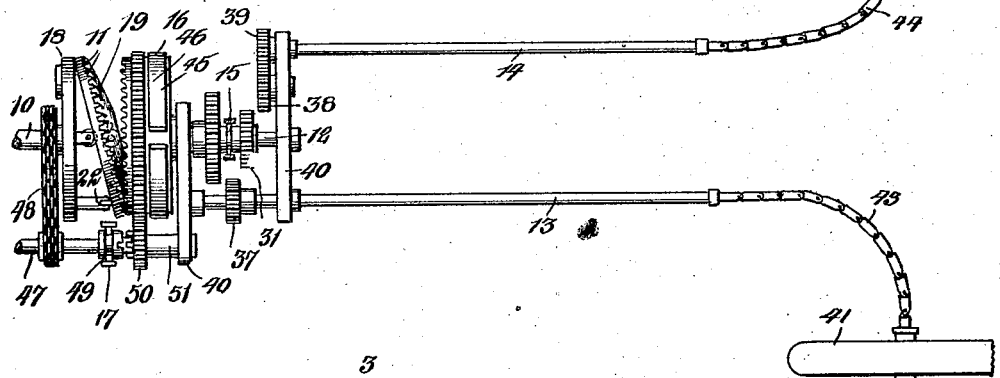
Figure 1 is a plan view showing one use of the mechanism of the present invention, the same being shown as connected to the driving road wheels of a vehicle for imparting motion thereto.
Figure 2:
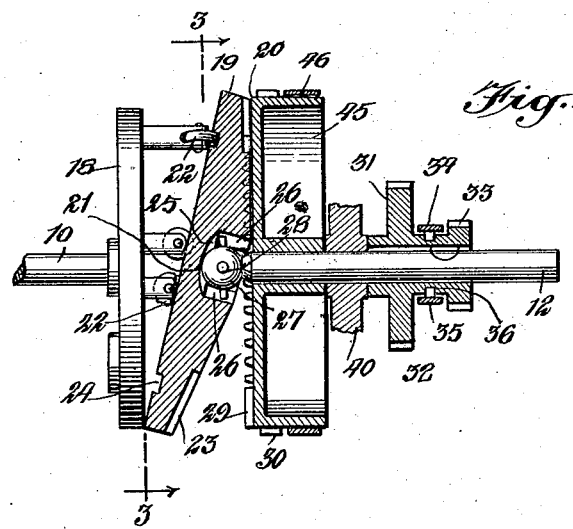
Fig. 2 is a sectional elevation of the speed reducing means and certain connected parts of the mechanism.
Figure 3:
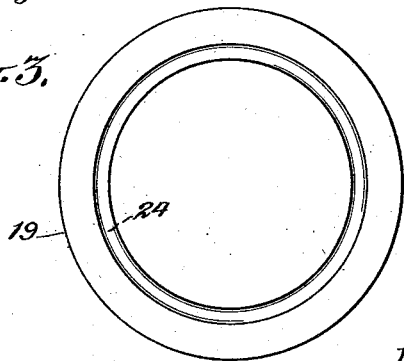
Fig. 3 is a sectional view taken substantially on the line 3—3 of Fig. 2 and looking in the direction indicated by the arrows.

Generally stated the present invention involves in combination a drive shaft 10, speed reducing means 11 operated by the drive shaft 10, a transmission or driven shaft 12 which is rotated through and by virtue of the means 11, driven shafts 13 and 14, means 15 for establishing and disestablishing connection between the transmission shaft 12 and said shafts 13 and 14, control means 16 for controlling the operation of the speed reducing means 11, and speed changing means 17 for changing the speed of the transmission shaft 12.

The speed reducing means 11 in the present embodiment comprises a cam disk 18, bevel gear 19, a second multiple gear 20, and a universal connection 21 between the gear 19 and the shaft 12. The disk 18 is provided with anti-friction rollers 22, the said rollers being arranged concentrically at one side of the disk, and said disk is keyed fast to the drive shaft 10. The bevel gear 19 has teeth 23 on one side thereof to present a beveled gear, and the opposite face of said gear is provided with a circular groove 24 arranged concentrically with respect to the axis of said gear. The gear 19 is provided with a recess 25 which opens into branch recesses 26. The gear 19 is supported for rotation and rocking motion by virtue of the connection 21 which comprises a ball 27 integral with the shaft 12 and radial pins 28 on the ball which are capable of being disposed respectively in the branch recesses 26. When the gear 19 is in place the rollers 22 will be disposed so as to travel in the groove 24 to impart rocking movement to the gear 19 in response to the rotation of the drive shaft 10. The second gear 20 is loosely mounted on the shaft 12 adjacent the gear 19 and said gear 20 is provided with teeth 29 which are of a greater number than the number of teeth 23 of the gear 19. The teeth 23 and 29 are adapted to set up a camming action due to the fact that there are more teeth on one gear than there is on the other gear, and as a result motion will be transmitted from one gear to the other according to which of the two gears is being rotated. The gear 20 is also provided with teeth 30 for a purpose to appear. The means 15 in the present instance includes a gear 31 which is loosely keyed on the shaft 12 for sliding movement and is provided with teeth 32 and 33. The gear 31 is slid by a suitable lever having a yoke 34, the pins 35 of which engage in an annular groove 36 in the gear 31. The means 15 also includes a gear 37 keyed to the shaft 13, a gear 38, and a gear 39 keyed to the shaft 14. The gear 38 meshes with the gear 39, and the teeth 32 and 33 of the gear 31 are adapted to mesh respectively with the teeth of the gears 37 and 38 when the gear 31 is shifted to its active position. Suitable bearings are provided in supports 40 for rotatably supporting the drive shaft 10 in axial alignment with the transmission shaft 12. One end of each of the shafts 13 and 14 is mounted in suitable bearings. The gear 38 is rotatable on a suitable shaft carried by one of the supports 40. As shown in Fig. 1 of the drawing the shafts 13 and 14 are connected respectively to the axles of road wheels 41 and 42 by the intervention of flexible shaft connections 43 and 44. It will now be apparent that when the drive shaft 10 is rotated motion will be transmitted to the disk 18, to the gear 19 by virtue of the rollers 22, the movement transmitted to the gear 19 being a rocking movement, and by virtue of the coaction of the teeth of the gears 19 and 20 rotary movement will be also imparted to the gear 19 which will be transferred to the shaft 12 by virtue of the intervention of the connection 21. The shaft 12 will be rotated in the same direction as the direction of rotation of the shaft 10 but at a greatly reduced speed. If now the gear 20 be held the direction of rotation of the shaft 12 will be reversed due to the fact that the camming action set up between the teeth of the gears 19 and 20 is free.

When the gear 20 is free the camming action mentioned is set up even though the gear 20 is permitted to move, whereas when the gear 20 is held, the gear 19 is caused to rotate in an opposite direction. The means 16 for controlling the operation of the means 11, in the present instance includes a brake drum 45 on the gear 20 and a brake band 46 which encircles the drum 45, the band being manipulated in any preferred manner to set up the necessary braking action to hold the gear 20 against rotation.

The means 17 for changing the speed ratio between the shaft 10 and the driven shafts 13 and 14 comprises a shaft 47 mounted in suitable bearings, a drive connection 48 between the shaft 10 and shaft 47, a clutch 49 between the shaft 47 and a gear 50 mounted for rotation on a stub shaft 51 carried by one of the supports 40. The teeth of the gear 50 meshes with the teeth 30 of the gear 20. By manipulating the clutch 49 it is possible to transfer motion from the shaft 10 to the gear 20, and this motion will be imparted by virtue of the coaction of the teeth to the gears 19 and 20 to the shaft 12 through the gear 19 at a changed speed.

From the foregoing it will be apparent that there has been described a mechanism for transmitting motion from the drive shaft 10 to the driven shafts 13 and 14 at a reduced speed, that the speed of rotation of the shafts 13 and 14 may be varied, that the shafts 13 and 14 are rotated in opposite directions, that the rotation of the shafts 13 and 14 may be reversed, and that by shifting the gear 31 to an inactive position motion will not be transmitted to the shafts 13 and 14.

I claim:

1. Speed reducing and motion transmission mechanism comprising a driving shaft, a transmission shaft, a disk secured to the driving shaft, a bevel gear, means between the transmission shaft and the bevel gear allowing said bevel gear to rock and causing said transmission shaft to turn with said bevel gear, a second gear loosely mounted on said transmission shaft, said gears being juxtaposed with respect to each other so that the teeth of the gears coact, the second gear having more teeth than the bevel gear, means for holding said second gear against rotation, and means between said disk and one face of said bevel gear causing the bevel gear to rock in response to the rotation of said driving shaft.

2. Speed reducing and motion transmission mechanism comprising a driving shaft, a transmission shaft, a disk secured to the driving shaft, a bevel gear, means between the transmission shaft and the bevel gear allowing said bevel gear to rock and causing said transmission shaft to turn with said bevel gear, a second gear loosely mounted on said transmission shaft, said gears being juxtaposed with respect to each other so that the teeth of the gears coact, the second gear having more teeth than the bevel gear, means for holding said second gear against rotation, and means on said disk acting on one face of said bevel gear causing the bevel gear to rock in response to the rotation of said driving shaft.

3. Speed reducing and motion transmission mechanism comprising a driving shaft, a transmission shaft, a disk secured to the driving shaft, a bevel gear, means between the transmission shaft and the bevel gear allowing said bevel gear to rock and causing said transmission shaft to turn with said bevel gear, a second gear loosely mounted on said transmission shaft, said gears being juxtaposed with respect to each other so that the teeth of the gears coact, the second gear having more teeth than the bevel gear, means for holding said second gear against rotation, and rollers on said disk acting on said bevel gear causing the bevel gear to rock in response to the rotation of said driving shaft.

LUDWIG CARL HARTMANN.